Figure 1:
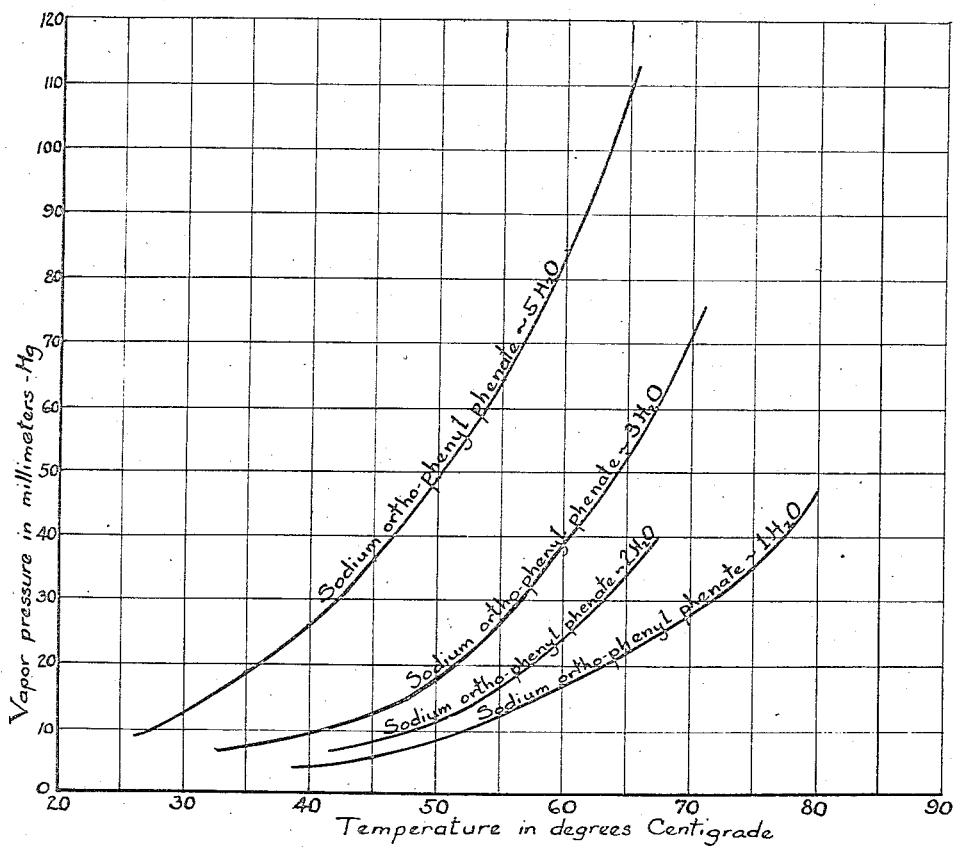

July 11, 1933. E. C. BRITTON 1,917,749
SODIUM ORTHO-PHENYL PHENATE AND METHOD OF PREPARING SAME
Filed Oct. 30, 1930

INVENTOR
BY Edgar C. Britton
Thomas Griswold, Jr.
ATTORNEY

Patented July 11, 1933

1,917,749

UNITED STATES PATENT OFFICE

EDGAR C. BRITTON, OF MIDLAND, MICHIGAN, ASSIGNOR TO THE DOW CHEMICAL COMPANY, OF MIDLAND, MICHIGAN, A CORPORATION OF MICHIGAN

SODIUM ORTHO-PHENYL PHENATE AND METHOD OF PREPARING SAME

Application filed October 30, 1930. Serial No. 492,130.

The present invention relates to a new compound, viz., sodium ortho-phenyl phenate, and to a method of preparing the same. The compound in question, so far as I am aware, has not been previously prepared or isolated, nor has it been referred to in the literature. The invention, then, consists of the aforesaid new product, the annexed drawing and following description setting forth one preferred method of preparing the same and giving certain physical properties thereof whereby such compound may be identified. This application is a continuation in part of my prior application Serial No. 392,263, filed September 12, 1929.

I have found that, when ortho-phenyl phenol is dissolved in an excess of aqueous sodium hydroxide solution and the resulting mixture suitably concentrated, the aforesaid sodium ortho-phenyl phenate may be crystallized therefrom in a form containing water of crystallization. I have determined that at least four hydrates of sodium ortho-phenyl phenate exist, containing, respectively, $5H_2O$, $3H_2O$, $2H_2O$ and $1H_2O$. The accompanying drawing shows the vapor pressure curves of the several hydrates. There is evidence to show the existence of a still more highly hydrated form of the salt, possibly a $6H_2O$ form, but this I have not yet definitely determined.

Of the aforementioned definitely identified hydrated forms of the compound, the $5H_2O$ salt effloresces in air of normal temperature and relative humidity, losing water of crystallization; the $3H_2O$ salt is relatively stable and permanent in air; while the lower hydrated forms, and the anhydrous salt as well, are deliquescent and absorb water from the air under normal conditions.

To prepare my new compound, ortho-phenyl phenol is dissolved by warming with a small excess, e. g. 10 to 15 per cent, of an aqueous sodium hydroxide solution, preferably of about 30 per cent strength, such that the resultant solution contains approximately 45 per cent by weight of the sodium salt. Upon cooling the solution an abundant precipitation of long white needle crystals occurs. The crystals are then filtered from the mother liquor, washed and dried. Analysis of the filtered and washed crystals indicates that the same consist chiefly of the $5H_2O$ hydrate, or possibly a mixture of the latter with a higher hydrated form of the salt. These crystals may be dried by exposure to relatively dry air at ordinary temperature to yield a product consisting essentially of the $3H_2O$ hydrate. Such trihydrate crystals are permanent in air and are not discolored upon long continued exposure to sunlight, in which respect the salt exhibits greater stability than the salts of phenol, the cresols, etc. The melting point of the trihydrated crystals is 77.5° C. These crystals dissolve freely in water, 100 grams of water dissolving 156.5 grams thereof at 25° C.

When crystals of the $3H_2O$ hydrate are placed over sulphuric acid, or other equivalent dehydrating agent, in a desiccator at ordinary temperature, further water of crystallization may be removed, yielding successively the $2H_2O$, $1H_2O$ and finally the anhydrous forms of sodium ortho-phenyl phenate. Complete dehydration to form the anhydrous salt may also be effected by heating gradually in a vacuo up to a temperature of about 120° C., such heating being regulated so that the crystals do not melt in their own water of crystallization as drying proceeds. The melting point of the anhydrous crystals is 282° C. When heated in air the latter crystals commence to decompose slowly at a temperature of about 180° C., but are more resistant to oxidation and decomposition than most other phenates.

Sodium ortho-phenyl phenate is useful as an antiseptic disinfectant, preservative, etc., and is also a convenient intermediate product for the preparation of derivatives of ortho-phenyl phenol, such as phenyl aspirin, phenyl salicylates, etc., or as an ingredient of pharmaceutical compositions, soaps, etc.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. As a new product, crystalline sodium ortho-phenyl phenate.

2. As a new product, sodium ortho-phenyl phenate in the form of crystals containing water of crystallization.

3. As a new product, sodium ortho-phenyl phenate containing 3 molecules of water of crystallization and having a melting point of 77.5° C.

4. As a new product, anhydrous sodium ortho-phenyl phenate having a melting point of 282° C.

5. The method of preparing sodium ortho-phenyl phenate which comprises dissolving ortho-phenyl phenol in an excess of sodium hydroxide solution with warming to make an approximately 45 per cent solution of the sodium salt thereof, cooling to crystallize such salt in hydrated form, filtering off such crystals, washing the same and finally drying.

Signed by me this 25 day of October, 1930.

EDGAR C. BRITTON.